UNITED STATES PATENT OFFICE 1,942,457

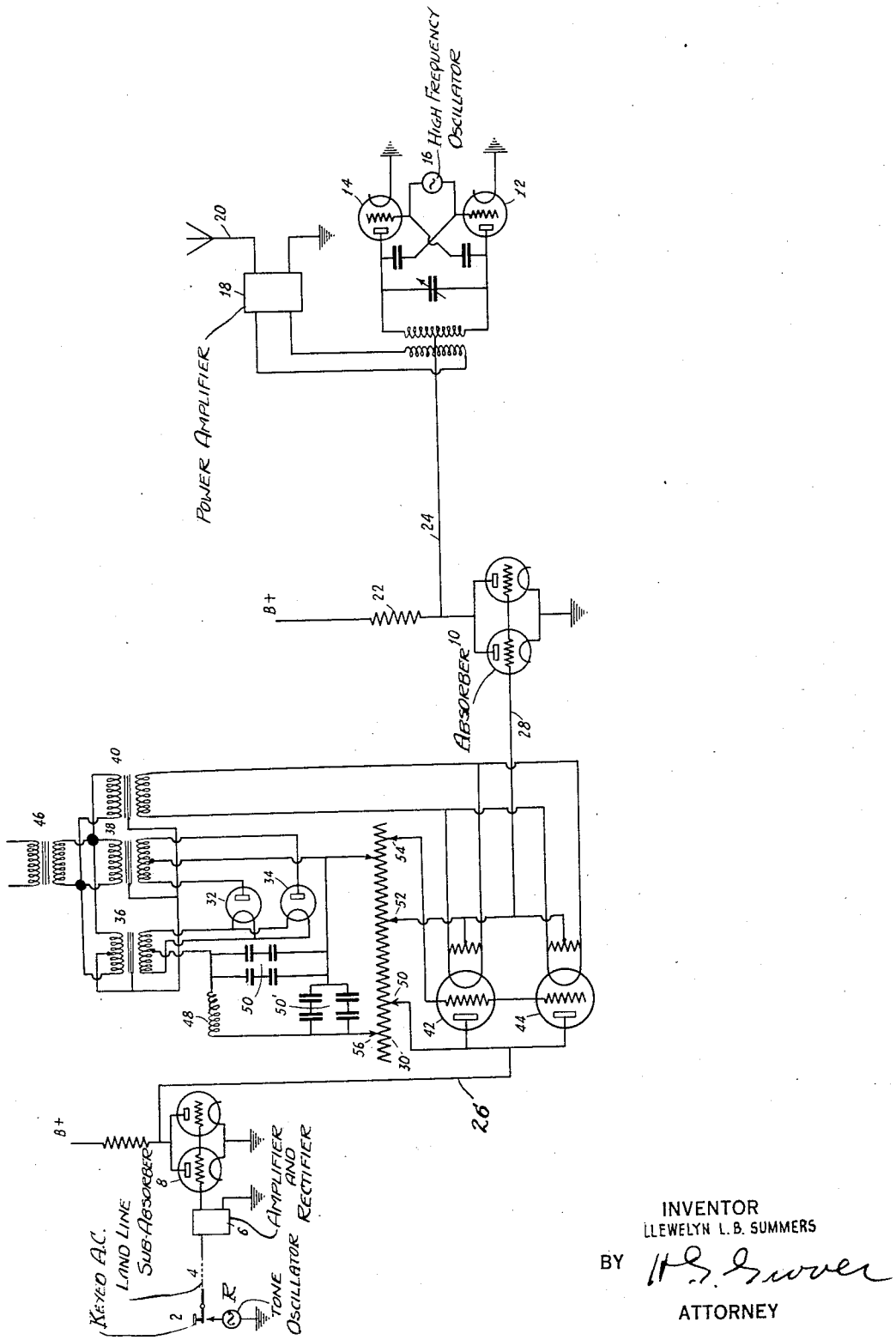

REGULATING SYSTEM

Llewelyn L. B. Summers, Whitestone, N. Y., assignor to Radio Corporation of America, a corporation of Delaware Application February 11, 1931. Serial No. 515,019

7 Claims. (Cl. 250—17)

This invention relates to a regulating system and has broadly as an object the provision of a system to prevent excessive current from flowing through a potentiometer or similar device due to certain changes, to be described more fully hereinafter, that may occur in such a system.

A further object of this invention is to provide suitable means or a device in combination with a rectifier for preventing excessive current flow in an external circuit associated with the rectifier in order to prevent such current flow from affecting the voltage regulation thereof.

For example, in a signaling system, rectified alternating energy is applied to a sub-absorber comprising an electron discharge device for causing conductivity or blocking thereof. The anode circuit of the sub-absorber is associated with the input circuit of an absorber, whose output circuit controls the flow of current in a working circuit, for example, high frequency energy in an antenna. In order to couple the anode circuit of the sub-absorber and input circuit of the absorber, it is necessary to insert in series with the connections thereto, a source of biasing potential which heretofore consisted of a group or bank of batteries. However, when the absorber input circuit drew current, a large current flow through the batteries resulted and necessitated their constant recharging at an excessive rate, causing their rapid deterioration.

It is an object of the present invention to remedy the foregoing difficulty and this is done by replacing the batteries with an impedance supplied with unidirectional potential from a rectifier. The sub-absorber and absorber, connected to the impedance, act as an external circuit tending at times to force excessive currents through the impedance which would require an unduly large rectifier to maintain correct voltage regulation. To overcome this defect, a further object of this invention is to provide one or more electron discharge devices in connection with the impedance which shall by-pass the excessive current, allowing the rectifier to be of nominal rating.

As the impedance, or preferably resistance, and its associated rectifier are coupled to circuits maintained at points at very high potentials, for example, the anode potential of the sub-absorber may be run as high as 10,000 volts, it is a further object to provide for the simple insulation of circuits energizing the rectifier and electron discharge devices associated with the output resistance of the rectifier. This is accomplished by providing a group of transformers for supplying energizing potentials to the cathodes of the electron discharge devices and rectifiers and to the anodes of the rectifier by ordinary commercial transformers, which transformers may be insulated as a whole from ground simply and cheaply by supplying them by a single transformer whose secondary may be efficiently insulated from ground.

Although I have defined my invention with particularity in the appended claims, my invention both as to its structural organization and mode of operation may best be understood by referring to the accompanying drawing, which, of course, is given by way of illustration only of the features of my invention.

Referring to the drawing, keyed alternating energy from a source 2 is supplied over a land line 4 to an amplifier and rectifier 6. The rectified energy causes, during marking, the paralleled electron discharge devices of a sub-absorber 8 to become conductive and during spacing to become non-conductive. Consequently, the electron discharge devices forming absorber 10, having their input circuits coupled to the anode circuit of sub-absorber 8, become non-conductive during marking and conductive during spacing by virtue of the potentials applied to the control electrodes thereof from the anode circuit of sub-absorber 8.

As a result of the foregoing action, anode potential supplied to amplifiers 12, 14 supplied with low power radio frequency energy from a suitable source 16 becomes sufficient or insufficient, during marking and spacing, respectively, to transmit energy from source 16 into power amplifier 18 and thence to be subsequently radiated from an antenna 20, or transmitted from power amplifier 18 to any other suitable working circuit. That is, when absorber 10 draws current, because of the voltage drop through resistance 22 associated with the anodes thereof, conductor 24 will supply to the tubes 12, 14 insufficient potential to cause amplification and further transmission of energy from source 16. When absorber 10 blocks, potential supplied by conductor 24 to tubes 12, 14 is sufficient to cause the feeding of energy into power amplifier 18.

In order to couple the input circuit of absorber 10 and the anode circuit of sub-absorber 8, it was heretofore necessary to insert between conductors 26, 28 a group of batteries which, as already indicated, were costly to maintain for the reason that they were charged at a rapid, destructive rate when absorber 10 drew current; and, if by-pass resistances were used, during marking, these batteries would be discharged at an excessive rate a balance between charging and discharge currents heretofore, being difficult if not impossible to maintain due to unavoidable and inherent signal irregularities, varying conditions of battery etc. These irregularities of biasing frequently result in traffic delays, poor signals and possible damage to tubes and equipment besides requiring much attention and renewals, a biasing rectifier of the ordinary type being impractical because of its disproportionate size and cost—both original and up keep—when used in a circuit of this type.

To overcome the foregoing difficulty, according to the present invention, the batteries are replaced by an impedance 30 preferably in the form of a resistance. The impedance is supplied with unidirectional potential from a full wave rectifier comprising electron discharge devices 32, 34 supplied with cathode alternating energizing potential from a transformer 36 and anode potential from a transformer 38. Transformers 36, 38 are paralleled together and to another transformer 40 which supplies cathode heating energy to paralleled electron discharge devices 42, 44 whose purpose, shall be explained more fully hereinafter.

For the sake of economy transformers 36, 38 and 40 are of an inexpensive type and are grouped together or may be formed as a single unit, and insulated as a whole from ground. The primaries thereof may be supplied with energy from a transformer 46, whose secondary is very efficiently insulated from potentials such as might be introduced by conductor 26, frequently amounting to 10,000 volts. In this manner, the three transformers 36, 38, 40 may be of the ordinary variety, the entire insulation from ground being accomplished by suitable insulation of secondary of transformer 46; whereas, it is to be noted, without transformer 46 each of the secondaries of transformers 36, 38 and 40 would of necessity require costly insulation. For smoothing action of the rectifier, a suitable choke 48 and smoothing condensers 50' are provided.

Turning back to impedance or resistance 30, it is assumed that conductors 26, 28 are tapped to suitable points 50, 52 on the resistance such that the voltage drop thereacross during normal operation of the rectifier is sufficient to properly bias the absorber 10 when the latter is nonconductive. Then, during that time or during marking, when the control electrodes or grids of the absorber 10 are negative, there is a relatively small current flow between points 50, 52 as a result of which the rectifier comprising tubes 32, 34 of very low rating is fully able to maintain correct biasing potential between points 50, 52.

However, during spacing, when the grids of the absorber 10 become positive, an excessive current would tend to flow between the portion of resistance 30 between points 50, 52; and, if the rectifier alone had to take care of this additional current flow and maintain proper conditions for operation, the rectifier rating or its size would have to be extremely large, as well as the resistance block increasing the cost of the apparatus materially.

In addition, the voltage across points 50, 52 due to increased current flow, would no longer be correct for desired operation. To overcome these difficulties, as already indicated, electron discharge devices 42, 44 are connected in a fashion such that their output circuits are paralleled across points 50, 52, whereas the control electrodes or grids of electron discharge devices 42, 44 are connected to a relatively more negative point on impedance 30 such as point 54.

By virtue of the last mentioned connection, at times when absorber 10 is not conductive, point 54 will be at a sufficiently high negative potential to cause blocking of tubes 42, 44. When, however, the voltage across points 50, 52 tends to increase due to current flow in the input circuit of electron discharge devices forming absorber 10, by virtue of the increased voltage drop across the section or portion of impedance 30 across points 50, 52, the anode voltage on tubes 42, 44 will increase, and the potential at point 54 will become less negative, since the voltage drop between points 56 and point 54 is relatively constant, maintained so by action of the rectifier. Because of the increased anode potential and decreased negative grid potential on tubes 42, 44, they become conductive and bypass excessive current flow from the external circuit involving sub-absorber 8 and absorber 10 around the section of resistance 30 between points 50 and 52 thereby allowing of the use of a rectifier of lower rating for correct operating conditions. In addition, of course, the full wave rectifier including tubes 32, 34 and resistance 30 remedy the evil of costly batteries heretofore necessary between the absorber and sub-absorber.

Having thus described my invention, what I claim is:

1. In combination, an electron discharge device having its anode circuit coupled to the input circuit of another electron discharge device whereby when said first mentioned electron discharge device is blocked, said second mentioned electron discharge device draws current; an impedance, in series with said anode circuit and said input circuit, supplied with potential from a source of unidirectional electrical energy; and, an electron discharge device associated with said impedance for by-passing current flow therethrough when said input circuit draws current.

2. In combination, an electron discharge device having its anode circuit coupled to the input circuit of another electron discharge device whereby when said first mentioned electron discharge device is blocked, said second mentioned electron discharge device draws current; a resistance, in series with said anode circuit and said input circuit, supplied with potential from a source of unidirectional electrical energy; and, an electron discharge device associated with said resistance for by-passing current flow therethrough when said input circuit draws current.

3. In combination, a source of keyed alternating energy, means for rectifying the energy, a sub-absorber comprising an electron discharge device associated with the means for rectifying the keyed energy whereby said sub-absorber becomes conductive and non-conductive according to the presence and non-presence of rectified energy; an absorber circuit comprising an electron discharge device acting in a reverse fashion to said sub-absorber, an impedance, supplied with unidirectional potential from a full wave rectifier, coupling the output circuit of said sub-absorber and the input circuit of said absorber, an electron discharge device connected to a portion of said impedance whereby the voltage drop across said portion is maintained constant despite current flow in the input circuit of said absorber; and, means associated with said absorber for controlling the presence of alternating energy in a working circuit in accordance with the conductivity of said absorber.

4. In combination, a source of keyed alternating energy; means for rectifying the energy; a sub-absorber comprising a pair of paralleled electron discharge devices associated with the means for rectifying the keyed energy whereby said sub-absorber becomes conductive and non-conductive according to the presence and non-presence of rectified energy; an absorber circuit comprising a pair of paralleled electron discharge devices acting in a reverse fashion to said sub-absorber; a resistance, supplied with unidirectional potential from a full wave rectifier, coupling the output circuit of said sub-absorber and the input circuit of said absorber; a pair of paralleled electron discharge devices connected to a portion of said resistance, whereby the voltage drop across said portion is maintained constant despite current flow in the input circuit of said absorber; and, means associated with said absorber for controlling the presence of alternating energy in a working circuit in accordance with the conductivity of said absorber.

5. In combination, an electron discharge device having its anode circuit coupled to the input circuit of another electron discharge device whereby when said first mentioned electron discharge device is blocked, said second mentioned electron discharge device draws current, an impedance in series with said anode circuit and said input circuit, means for supplying a uni-directional potential to said impedance from an alternating current source, said means comprising a transformer connected to said alternating current source, a rectifier device connected to said transformer, a filter comprising a choke and a plurality of condensers connected to said rectifying device for smoothing out the alternating current flow, and an electron discharge device connected across a portion of said impedance acting to maintain constant voltage regulation when said input circuit draws current.

6. In combination, an electron discharge device having an output circuit, an electron discharge device having an input circuit, said output and input circuits being coupled together, one of said devices being arranged to pass current when the other is blocking, an impedance in series with said output circuit and said input circuit supplied with potential from a source of uni-directional electrical energy, and an electron discharge device associated with said impedance for by-passing current therethrough when the stability of said input and said output circuits is altered.

7. A voltage regulation system to prevent excessive current from flowing through a potentiometer, comprising in combination an electron discharge device having an output circuit, an electron discharge device having an input circuit, one of said devices being arranged to pass current when the other is blocked, a potentiometer connecting said input and output circuits in series, a source of direct current potential supplied to said potentiometer, an electron discharge device having its anode connected to an intermediate point on said potentiometer at substantially the same points as said output circuit and its cathode connected to said potentiometer at substantially the same point as said input circuit so as to maintain said system at a constant voltage.

LLEWELYN L. B. SUMMERS.